United States Patent [19]

Pepper

[11] Patent Number: 4,767,195
[45] Date of Patent: Aug. 30, 1988

[54] SYSTEM AND METHOD FOR ENCODING INFORMATION ONTO AN OPTICAL BEAM

[75] Inventor: David M. Pepper, Malibu, Calif.

[73] Assignee: Hughes Aircraft Company, Los Angeles, Calif.

[21] Appl. No.: 842,344

[22] Filed: Mar. 21, 1986

[51] Int. Cl.$^4$ .......................... G03H 1/02; G02B 5/23; G02F 1/01; H01S 3/10

[52] U.S. Cl. .................................... 350/354; 350/356; 350/393; 350/3.62; 372/21; 372/26

[58] Field of Search ................ 307/425; 350/354, 356, 350/393, 3.62; 372/99, 21, 26

[56] References Cited

U.S. PATENT DOCUMENTS

| | | | |
|---|---|---|---|
| 3,527,521 | 9/1970 | Osterink et al. | 350/393 |
| 4,428,873 | 1/1984 | Murayama et al. | 350/356 |
| 4,500,855 | 2/1985 | Feinberg | 372/21 |
| 4,529,273 | 7/1985 | Cronin-Golomb et al. | 350/354 |

FOREIGN PATENT DOCUMENTS 2135050 8/1984 United Kingdom .

OTHER PUBLICATIONS

R. A. Fisher, "Optical Phase Conjugation", 1983, Academic Press, (New York, US), pp. 417–443.
J. P. Huignard, "Materiaux Non Lineaires a Variations d'indice Photoinduite et Applications", pp. 305–313.
M. Cronin-Golomb, "Vibration Resistance, Short Coherence Length Operation and Mode-Locked Pumping in Passive Phase Conjugate Mirrors", pp. 1131–1133, vol. 47, 1985, Applied Physics Letters.
J. Strait et al, "Photorefractive Four Wave Mixing in GaAs using Diode Lasers Operating at 1, 3 $\mu$m", Applied Optics, vol. 25, Feb. 1986, pp. 338–339.
A. A. Chaban, "The Acoustophotorefractive Effect", Soviet Physics Acoustics, vol. 29, No. 6, Nov.–Dec. 1983, pp. 496–497.
B. T. Anderson et al, "Self-Pumped Phase Conjugation in BaTiO$_3$ at 1.06 $\mu$m", Optics Letters, vol. 10, No. 12, Dec. 1985, pp. 627–628.
R. Reinisch et al., "Fast Pockels Light Modulator Using Guided Wave Resonance", Applied Optics, vol. 24, Jul. 1985, pp. 2001–2004.
A. Yariv, "Introduction to Optical Electronics, 2d ed.", pp. 246–253 (1976).
Giuliano, "Applications of Optical Phase Conjugation", Apr. 1981, pp. 1–8, Physics Today.
A. Yariv, IEEE, J. Quantum Electronics, QE 14, No. 9, pp. 650–660, Sep. 1978.
H. I. Mandelberg, "Phase Modulated Conjugate Wave Generation in Ruby", Optics Letters, vol. 5, pp. 258–260 (1980).
White et al., "Coherent Oscillation by Self–Induced Gratings in the Photorefractive Crystal", Appl. Physics Lett., 40(6), pp. 450–452 (1982).
J. Feinberg, "Self-Pumped, Continuous-Wave Phase Conjugator Using Internal Reflection", Optics Letters, vol. 7, No. 10, pp. 486–488, Oct. 1982.
Stepanov et al, "Efficient Unstationary Holographic Recording in Photorefractive Crystals Under an External Alternating Electric Field", Optics Communications, 53(5), pp. 292–295, Apr. 1985.

(List continued on next page.)

Primary Examiner—Eugene R. LaRoche
Assistant Examiner—Michael Shingleton
Attorney, Agent, or Firm—V. D. Duraiswamy; A. W. Karambelas

[57] ABSTRACT

A system and method for encoding information onto an optical beam is described in which a photorefractive material is used to modulate the beam. An alternating electric field is applied to the photorefractive material and modulated so as to vary the material's index ellipsoid via the electro-optic effect and hence modulate an output beam in accordance with the information to be encoded. The invention has applications to both externally pumped and self-pumped phase conjugate mirrors, and to other optical systems. Various modulation techniques can be used, and the modulation can be isolated from noisy beams by applying the modulating electric field on a high frequency carrier.

34 Claims, 4 Drawing Sheets

OTHER PUBLICATIONS

Petrov et al, "New Mechanisms of Holographic Recording and Wavefront Conjugation in Cubic Photorefractive Crystals", ICO-13 Conference Digest, 1984, pp. 430-431.

Stepanov et al., "Efficient Phase Conjugation in the Photorefractive Crystal $Bi_{12}TiO_{20}$", Sov. Tech. Phys. Lett. 10(11), pp. 572-573, Nov. 1984.

Cronin-Golomb et al, "Laser with Dynamic Holographic Intracavity Distortion Correction Capability", Appl. Phys. Lett., 41(3), pp. 219-220, Aug. 1982.

H. Vanherzeele et al, "Pulse Compression by Intracavity Degenerate Four-Wave Mixing", Applied Optics, vol. 20, No. 4, pp. 524-525, Feb. 15, 1981.

H. Vanherzeele et al, "Mode-Locked Laser Oscillation Using Self-Pumped Phase-Conjugate Reflection", Optics Letters, vol. 6, No. 10, pp. 467-469, Oct. 1981.

John Auyeung, "A Theoretical and Experimental Investigation of the Modes of Optical Resonators with Phase-Conjugate Mirrors", IEEE Journal of Quantum Electronics, vol. QE-15, No. 10, pp. 1180-1188, Oct. 1979.

SYSTEM AND METHOD FOR ENCODING INFORMATION ONTO AN OPTICAL BEAM

BACKGROUND OF THE INVENTION

1. Field of the Invention

This invention relates to a system and method for encoding information onto an optical beam, and more particularly to the encoding of information onto an optical beam transmitted through a photorefractive material in devices such as phase conjugate mirrors.

2. Description of the Prior Art

Photorefractive materials have been used in a number of different applications involving the processing of optical beams. One principal application is in phase conjugate mirrors (PCMs). Other applications include holography, image processing and the performance of optical mathematical functions such as image amplification, pattern subtraction and pattern recognition. In each of these applications the photorefractive optical system has been essentially passive in the sense that it has a known response to an input optical beam, and in effect produces an output beam that is slaved to the input beam.

Since PCMs and photorefractive devices in general are of interest in this invention, it will be helpful to briefly review some of their basic operating and structural characteristics.

In general, a photorefractive material is one in which the index of refraction changes under the influence of applied light, such as a laser beam. The light causes charges within the photorefractive material to migrate and separate, producing an internal electrostatic field. This field produces a change in the crystal's refractive index by the linear electro-optic effect (the Pockels effect). The theory of the electro-optic effect is described in a text by A. Yariv, "Introduction to Optical Electronics, 2d ed.", pp. 246-53 (1976). The photorefractive "index grating", or periodic variation in the crystal's index of refraction, is a measure of the change in the index. Photorefractive materials generally comprise III-V and II-VI semiconductor combinations within the periodic table, and other crystals such as $BaTiO_3$, $Bi_{12}SiO_{20}$ and $KTa_{1-x}Nb_xO_3$.

Figure 1:
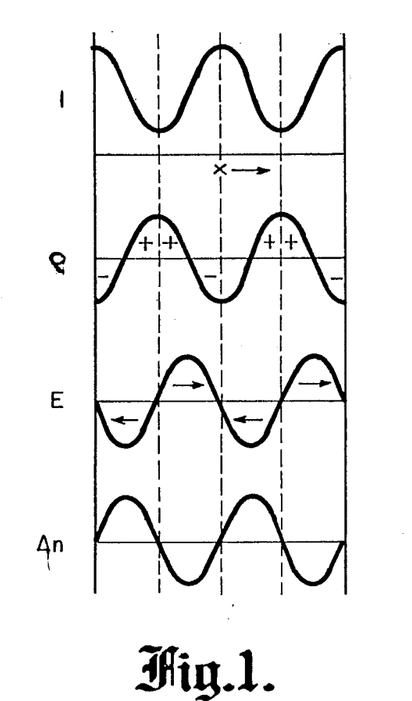
FIG. 1 is a series of graphs illustrating the formation of a photorefractive index grating.

The formation of a photorefractive index grating is illustrated in FIG. 1, in which the horizontal axis represents distance within the photorefractive crystal. The upper graph illustrates the pattern of light with a spatially periodic intensity I within the crystal, while the next graph illustrates the resulting charge density $\rho$ within the crystal. The mobile charges, illustrated as being of positive polarity, tend to accumulate in the dark regions of the light intensity pattern. The resulting periodic charge distribution produces a periodic electrostatic field E by Poisson's equation. This electric field, illustrated in the third graph of FIG. 1, then causes a change in the refractive index $\Delta n$ of the crystal by the linear electro-optic effect. The electro-optic coefficient is proportional to the ratio of the refractive index change to the space charge electrostatic field within the crystal material. The photorefractive effect, illustrated in the last graph of FIG. 1, is non-local in that the maximum refractive index change does not occur at the peak of the light intensity. In FIG. 1 the spatial shift between $\Delta n$ and I is ¼ (a 90° phase shift) of the grating period; in general, however, this shift can be any fraction of the grating period.

Phase conjugation is an optical phenomenon that has attracted considerable attention in recent years. Several different ways of producing phase conjugated beams have been discussed in the literature, including four-wave mixing, stimulated Brillouin scattering, Raman scattering, three-wave mixing and photon echo devices. A review of various applications of optical phase conjugation is presented by Giuliano in Physics Today, "Applications of Optical Phase Conjugation", April 1981, pages 27-35. A general review of the field is given in A. Yariv, IEEE, J. Quantum Electronics QE14, 650 (1978), and in "The Laser Handbook Vol. 4", edited by M. L. Stitch and M. Boss, Chapter 4 by the present inventor, "Non-Linear Optical Phase Conjugation", pages 333-485, North Holland Publishing Co. 1985.

Figure 2:
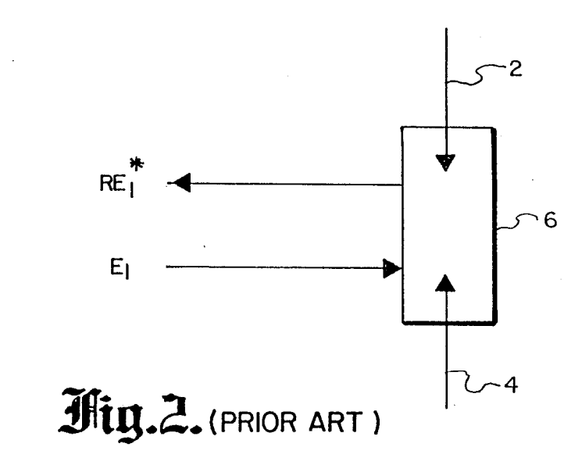
FIG. 2 is an illustrative diagram of a prior art PCM employing four-wave mixing.

Basically, a phase conjugate mirror (PCM) produces a retro-reflective reflection of an incident beam, with the phase of the reflected beam reversed from that of the incident beam at the point of reflection. A typical PCM known in the prior art is shown in FIG. 2. This is illustrated as a four-wave mixer, in which a pair of contradirectional laser beams 2 and 4 are directed into an optical mixing medium 6. An initializing laser beam $E_I$, equal in frequency to beams 2 and 4, is directed into the mixing medium from the side. As a result of the action of the various beams within the mixing medium, a reflected beam $RE_I^*$, where R is the coefficient of reflectivity, is reflected back in a direction opposite to incident beam $E_I$. Since power is pumped into the system by beams 2 and 4, the reflector may produce an amplification which makes R greater than 1.

Figure 3:
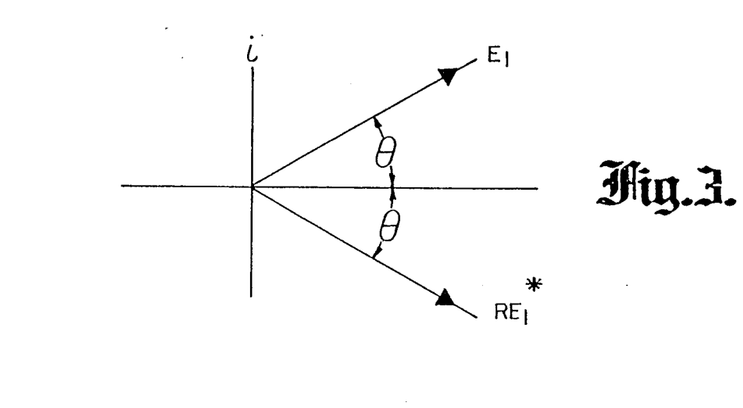
FIG. 3 is a phase diagram showing the incident and reflected beams of a phase conjugation system.

In addition to being retro-reflective to the incident beam, the phase conjugated reflected beam also undergoes a phase reversal with respect to the incident beam at the point of reflection. This is illustrated in the phase diagram of FIG. 3, which depicts the incident and reflected waves as vectors plotted against a horizontal real axis and a vertical imaginary axis. It may be seen that the phase angle of the reflected beam $RE_I^*$ is equal in absolute magnitude but reversed in polarity from the incident beam $E_I$.

PCMs can be provided either with external pumping beams, as in the four-wave mixer illustrated in FIG. 1, or as a "self-pumped" device which eliminates the requirement for external pump beams. In one application external information has been encoded onto the output beam of a four-wave mixer by modulating the pump beams, e.g., H. I. Mandelberg, "Phase Modulated Conjugate Wave Generation in Ruby", Optics Letters, Vol. 5, p. 258, 1980. However, this technique requires the use of both external pump beams and an external modulator.

Of the self-pumped PCMs, those employing Brillouin or Raman scattering are generally employed in connection with high power pulsed laser beams, such as from a Nd:YAG laser, but are not practical with low power continuously operating lasers such as HeNe devices. Another type of self-pumped PCM is based upon the use of a photorefractive material, which usually possesses a high electro-optic coefficient as the phase conjugating medium. Such a self-pumped PCM has been employed with continuously operating, low-power lasers such as HeNe lasers.

While photorefractive materials have been used as PCMs and other devices to produce a known response to an input optical beam, they have not been used to transmit additional information. Since many of these devices constitute effective communications channels, they are not being fully utilized when their use is thus restricted to the limited purposes for which they were originally developed.

SUMMARY OF THE INVENTION

It is an object of the present invention to greatly expand the potential utilization of photorefractive materials by using them as a communications channels for information that can be encoded onto optical beams.

Another object is the provision of photorefractive optical devices which are capable of encoding information onto a laser beam at a high frequency carrier level well above the characteristic laser noise bandwidth, thereby substantially isolating the encoded information from the laser's noise spectrum.

Other objects include the realization of a remote, encodable retro-beam; the encoding of information onto an optical beam at high data rates and with a potential for multiplexing numerous different information channels; the ability to encode an optical beam with either frequency, phase, polarization or amplitude modulation; and the achievement of a compact, lightweight information encoding system with low modulation power/voltage requirements.

In addition, it is an object to provide an information encoding system and method which is particularly suited for a self-pumped PCM, and which can be adapted for use in an improved mode-locked phase conjugate laser.

In the realization of these and other objects of the invention, a body of photorefractive material is adapted to receive an optical beam, and means are provided to establish an alternating electric field within the body. The alternating electric field which can be unipolar or bipolar is then modulated within the body to encode desired information onto the output beam. The encoding takes place through a modulation of the body's refractive index ellipsoid via the electro-optic effect. Various modulation techniques include modulating the frequency, phase or amplitude of the alternating electric field, or the relative polarization of the beam with respect to the input optical field. The fields, and thereby the output beam, can be encoded with information from a number of different information channels which are multiplexed either in the time or frequency domain. When used with a noisy input laser beam, the alternating electric field can be established at a substantially higher frequency than the laser noise bandwidth, thereby permitting a modulating signal which is within the same frequency regime as the beam frequency's noise spectrum to be isolated from the beam noise by placing it upon the higher frequency field carrier through the use of phase sensitive detection devices.

The invention is applicable to photorefractive optical devices such as PCMs of either the self-pumped or externally pumped variety. When applied to a photorefractive PCM, which can be made to self-pump by means of an additional alternating electric field, the modulating signal can be developed either in a substantially higher frequency range than the photorefractive response, thereby encoding information onto the phase conjugated output beam primarily through modulation of the photorefractive material's index ellipsoid via the electro-optic effect, or within the frequency regime of the photorefractive effect, thereby encoding information onto the output beam by modulating both the electro-optic effect and the material's photorefractive response.

Numerous applications are made possible by the novel encoding scheme, such as the use of a PCM for remote sensing, the use of one or two PCMs for interferometric sensing, a mode-locked phase conjugate laser and various possible optical mathematical functions such as image amplification.

These and other features and advantages of the invention will be apparent to those skilled in the art from the following detailed description of preferred embodiments, taken together with the accompanying drawings, in which:

DESCRIPTION OF THE DRAWINGS

FIG. 7 is a block diagram of the invention utilized in a remote sensing application;

DETAILED DESCRIPTION OF PREFERRED EMBODIMENTS

Figure 4:
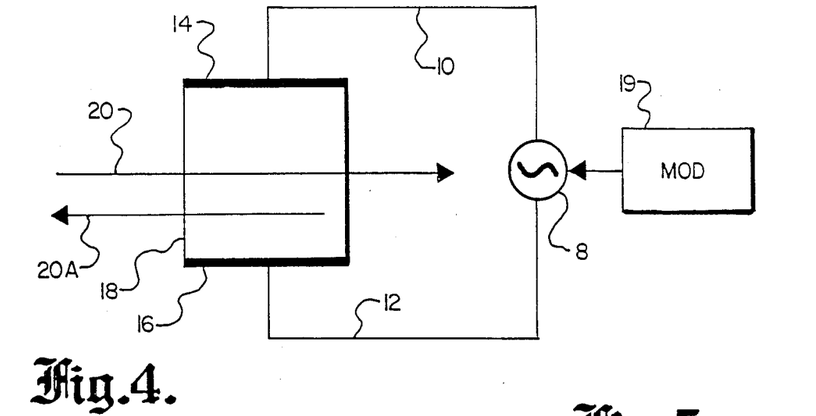
FIG. 4 is a block diagram of a basic implementation of the invention.

The basic operation of the invention is illustrated in FIG. 4. An alternating voltage source 8 is connected by lead wires 10 and 12 to electrodes 14 and 16 placed on opposite faces of a crystal 18 formed from a photorefractive material. Electrodes 14 and 16 preferably consist of films of conductive material painted onto the opposite faces of the photorefractive crystal 18. Voltage source 8 establishes an alternating electric field through the crystal which affects the crystal's index ellipsoid via the electro-optic effect. A modulator 19 modulates source 8, thereby encoding the alternation of the crystal's electric field with the information contained in the modulating signal. This in turn modulates the crystal's index ellipsoid via the electro-optic effect, causing the encoded information to be picked up by a laser beam 20 transmitted through the crystal. In this manner information can be transferred from an information source represented by modulator 19 to a laser beam. In the case of a PCM, an encoded phase-conjugated output beam 20A will be produced.

The effect of the modulating signal upon the laser beam will depend upon the frequency of the carrier electric field signal from source 8. For carrier frequencies substantially greater than the photorefractive responsivity of the photorefractive material, the modulating signal will be transferred onto the laser beam almost solely by modulation of the crystal's index ellipsoid via the electro-optic effect. For carrier frequencies within the bandwidth of the crystal's photorefractive response, the modulated carrier signal will encode the output beam through an effect on both the crystal's index ellipsoid via the electro-optic effect and a modulation of its photorefractive response.

Various forms of signal modulation may be used, including frequency modulation, phase modulation, and amplitude modulation, resulting in a modulation of the laser beam's frequency, phase, amplitude or relative polarization. The latter form of modulation can be accomplished by a controlled variation of the relative field/crystal spatial orientation, or by the addition of special polarizing elements.

Figure 5:
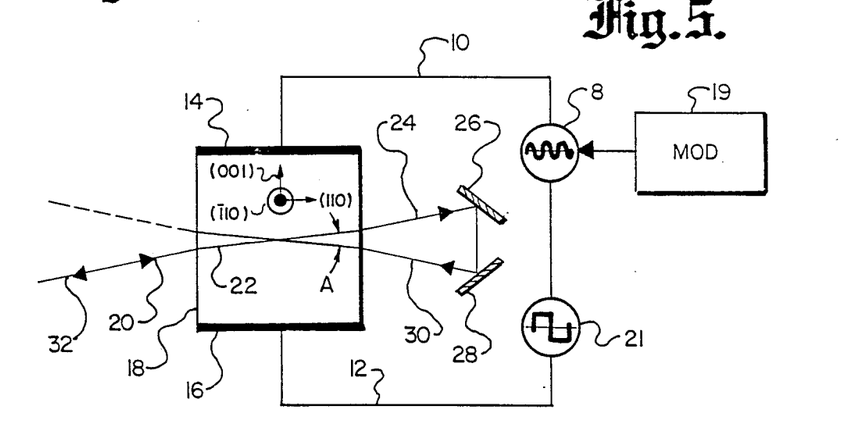
FIG. 5 is a block diagram of the invention as applied to a self-pumped photorefractive PCM with the information signal isolated from the beam noise.

The application of the invention to a self-pumped (no external pump beams) PCM is illustrated in FIG. 5. While a particular type of self-pumped PCM is shown, it should be understood that the invention is applicable to any self-pumped or non self-pumped PCM employing a photorefractive material as the conjugating medium. An AC voltage source 21 is connected by lead wires 10 and 12 to electrodes 14 and 16 on the crystal 18. In certain classes of crystals, the frequency and intensity of source 21 must be chosen such that the alternating electric field between electrodes 14 and 16 establish as a photorefractive grating shift of 90° within the crystal. The crystal orientation is as indicated in the drawings, with the vertical axis (0-0-0), the horizontal axis (1-1-0) and the z axis emerging from the paper (1-1-0).

An input probe laser beam 20 is directed through the crystal, which refracts the beam along a path 22 within the crystal. The beam is again refracted back to its original direction when it emerges from the opposite side of the crystal as an output beam 24. The output beam is deflected by a pair of turning mirrors 26,28 back through the crystal as a return beam 30. The turning mirrors 26,28 could be implemented as a single corner mirror if the angle between output beam 24 and return beam 30 is small enough. Also, the beam deflection might be accomplished at the crystal surface by applying a reflective coating to the crystal, by using a crystal whose surface was inherently reflective, or by using the proper incident angle so that the beams within the crystal become reflected by the surface via total internal reflection. Self-pumped crystals using stimulated backscattering can also be used. The mirror apparatus directs the return beam 30 so that it intersects the probe beam 22 within the crystal at an angle A. The two beams cross-couple with each other, transferring energy from return beam 30 and forming a phase conjugate of the probe beam, the phase conjugated beam 32 emerging from the crystal along a path which is substantially retro-reflective to the original probe beam 20.

A carrier signal provided by alternating voltage source 8 is connected in series with the voltage source 21 and the crystal electrodes 14,16. Source 8 is modulated by a modulator 19 as in FIG. 4, and thereby superimposes a modulated electric field onto the field established across the crystal by source 21. As discussed in further detail below, the information contained in the modulating signal is impressed onto the output beam by the modulated carrier signal's influence upon the index ellipsoid of the photorefractive material via the electro-optic effect and, for modulated carrier signals within the same frequency regime as electric field source 21, also by a modulation of the crystal's photorefractive response.

The implementation shown in FIG. 5 is preferred because it provides a unique self-pumped PCM that can use a much wider and more advantageous range of materials for the conjugating medium than previously available. This type of conjugator is disclosed and claimed in co-pending U.S. patent application Ser. No. 836,679, "Self-Pumped Phase Conjugate Mirror and Method Using Photorefractive Conjugating Medium", filed Mar. 5, 1986 by George Valley and Marvin Klein and assigned to the assignee of the present invention, the contents of which are incorporated herein by reference. In this type of PCM an alternating electric field is established across a photorefractive body, increasing the gain of the body to a level at which self-pumping action takes place. This enables the use of photorefractive materials with relatively low electro-optic coefficients, such as common semiconductors, as the conjugating medium of a self-pumped PCM. Prior to this advance self-pumped photorefractive PCMs had been limited to high electro-optic materials, such as $BaTiO_3$ (barium titanate) and $Sr_{1-x}Ba_xNb_2O_6$ (strontium barium niobate). Such prior devices are disclosed in White et al., Appl. Phys. Lett. 40, 450, 1982 and Feinberg, Opt. Lett. 7, 486, 1982. The higher electro-optic coefficient materials, however, have several drawbacks. They are difficult to obtain in good optical quality and large sizes, operate in relatively small temperature ranges, have a relatively slow photorefractive responsivity, and are not sensitive at all wavelengths of interest. The application of an alternating electric field as proposed by Valley and Klein makes it possible to incorporate much lower electro-optic coefficient materials such as semiconductors into a self-pumped PCM. The Valley and Klein work indicates that, for such materials, the internal crystal angle A between the input and return beams is optimally less than 5° (less than 3° for GaAs). By contrast, the optimum angle for the previously known $BaTiO_3$ PCM is about 10°.

A recent series of papers have been published by Stepanov and Petrov in which the use of photorefractive materials for both phase conjugation and holography was discussed (Optics Communications 53, 292, Apr. 1, 1985; Proc. of ICO-13, Sapporo, 1984; Sov. Tech. Phys. Lett. 10 (11), November 1984). These papers developed the concept of applying an alternating electric field to a photorefractive material to increase its two-wave mixing gain coefficient for holographic and image processing applications. The present invention involves modulating the electric field applied to the photorefractive medium, and is useful for both the Valley/Klein and Stepanov/Petrov applications. The concept may also be applied to other photorefractive optical systems which do not inherently incorporate or require an alternating electric field by simply adding the field and then modulating it.

In FIG. 5 the frequencies of the various signals may vary considerably, depending upon the particular material used. For a semiconductor such as GaAs with a relatively fast photorefractive response time in the order of 0.1-10 microseconds, 90° shifted gratings will be formed to elicit a phase conjugating response when the signal from source 21 has a frequency in the order of 0.1-10 MHz. In this case the carrier signal 8 could be in the order of a Gigahertz or more. For a slower photorefractive response material such as $BaTiO_3$, with a response time of about 1-100 msec., the frequency of source 21 (if it is used at all) would be in the order of 10–1,000 Hz (since BaTiO$_3$ has a high electro-optic coefficient, it is inherently self-pumping without an applied electric field, and source 21 could be dispensed with).

The use of a high frequency carrier as illustrated in FIG. 5 offers a substantial advantage in terms of noise reduction. The laser beams employed in PCMs are often quite noisy, and this noise can limit the ability to obtain useful information encoding on the beam, especially when the modulator 19 operates in the same frequency regime as the laser beam. This problem is substantially eliminated by employing a carrier signal 8 at a much higher frequency than the beam frequency, and isolating the modulating signal from the beam noise by placing it on top of the carrier.

Figure 6:
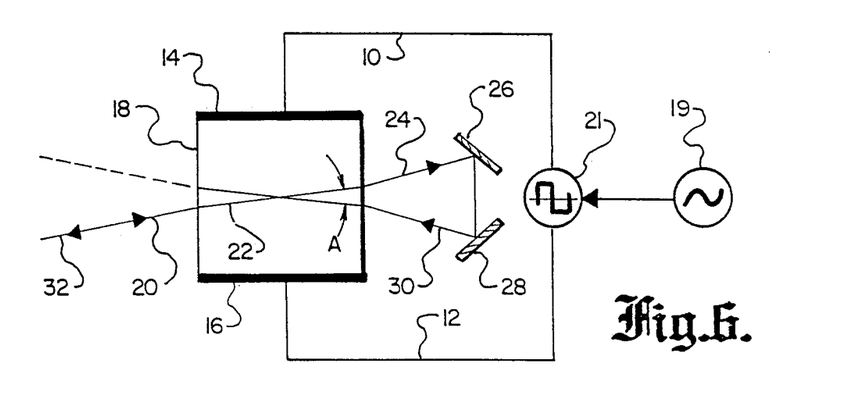
FIG. 6 is a block diagram of the invention as applied to a self-pumped photorefractive PCM with a self-pumping alternating signal providing a carrier for the information signal.

If an external electric field is applied as described to induce self-pumped operation, and it is desired to limit the carrier frequency to the bandwidth of the photorefractive response, the output of modulator 19 could be applied directly to source 21 as indicated in FIG. 6. In this embodiment source 21 serves the dual role of establishing 90° shifted gratings for self-pumping operation, and providing a carrier for the modulating signal.

The information transfer system described thus far may have many different applications, such as in fiber sensors, interferometers, ring laser gyroscopes, remote beacons, friend-or-foe identification, fiber communication links, mode-locked phase conjugate lasers/resonators, two-wave and four-wave mixer/modulator schemes, and many optical mathematical functions such as image amplification, pattern subtraction and pattern recognition. A remote fiber optic sensing application is illustrated in FIG. 7. In this system remote sensor 38 provides information on a desired characteristic, such as temperature. It produces a modulating signal that varies with the parameter being measured, and is applied to modulate the alternating voltage output of a voltage source 40. The source voltage is applied across a photorefractive crystal such as that shown in the previous figures and identified by the same reference numerals. A laser 42 produces a beam that is focused by lens 44 onto one end of an optical fiber 46, the remote end of which emits a beam that is collimated by lens 48 onto the photorefractive crystal 18. A phase conjugate of the input beam to the crystal is directed back through the lens and optical fiber system, the return signal being encoded with the modulating signal from sensor 38. This signal can then be extracted from the beam at a remote location from sensor 38 by means of a one-way mirror 49 in the beam path and a detection unit 50.

The retro-reflective characteristic of the PCM assures that the output beam will be accurately focused onto the end of the optical fiber, even if it is somewhat misaligned or if it changes in time. Although the sensing system is illustrated as using a self-pumped PCM with the modulation scheme shown in FIG. 6, it should be understood that the remote sensing application is equally compatible with the modulation scheme of FIG. 5 or with a pumped PCM.

Figure 8:
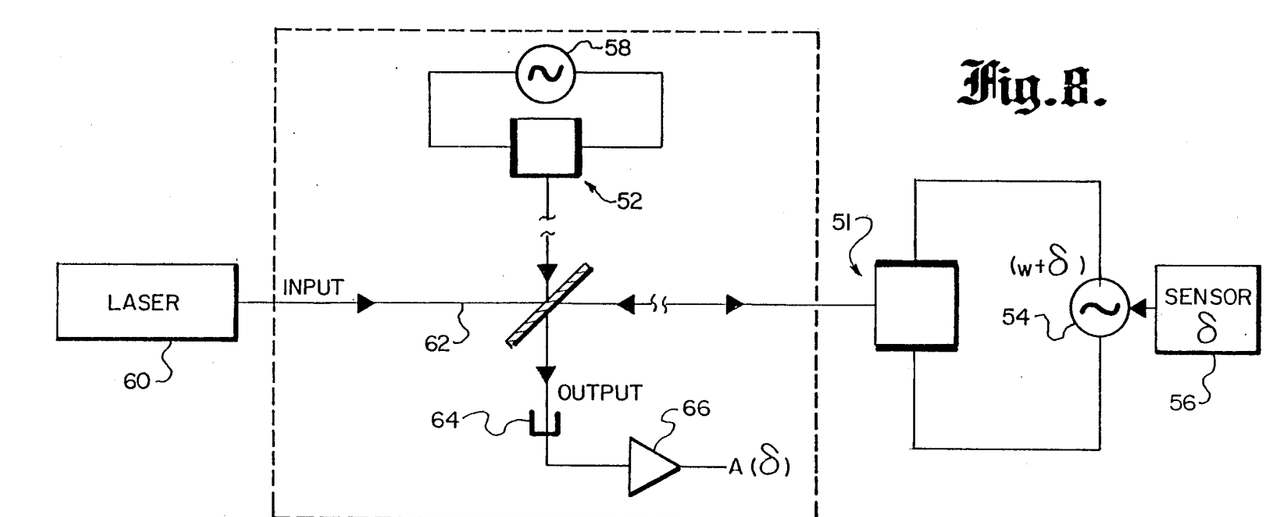
FIG. 8 is a block diagram of the invention employed in a remote heterodyne sensing application.

Referring now to FIG. 8, an application to interferometric sensing is shown. In this application a pair of self-pumped PCMs 51 and 52, constructed in a manner similar to those previously described, are employed. (The PCM mirrors are again not shown for simplicity). If necessary the first PCM 51 can be made self-pumping by means of an electric field voltage source 54 to which a modulating signal from a sensor 56 is applied. The second PCM 52 chosen to be identical to PCM 51, can also be made self-pumping by means of an unmodulated electric field voltage source 58 whose frequency is equal to that of source 54. A laser 60 directs a beam to a beam splitter/mirror 62, which splits the beam and directs it to the two PCMs. The phase conjugate return beams from the two PCMs are then directed by element 62 to an output stage 64, which delivers the combined beams to an interferometric (heterodyne) detector 66. Detector 66 produces an output which indicates any frequency differences between the two returned beams. Thus, PCM 52 serves as a reference for the beam returned from modulated PCM 51, enabling the low frequency modulating signal to be extracted by detector 66, which sees the difference in frequency between the two PCMs.

If the electric field frequency of the voltage sources 54 and 58 is greater than about 10–20 MHz, the system will operate above the noise spectrum of most lasers. This produces an improved signal/noise ratio, especially for small modulation frequencies. Again, self-pumped PCMs are illustrated but in general any photorefractive-based PCM could be used.

Figure 9:
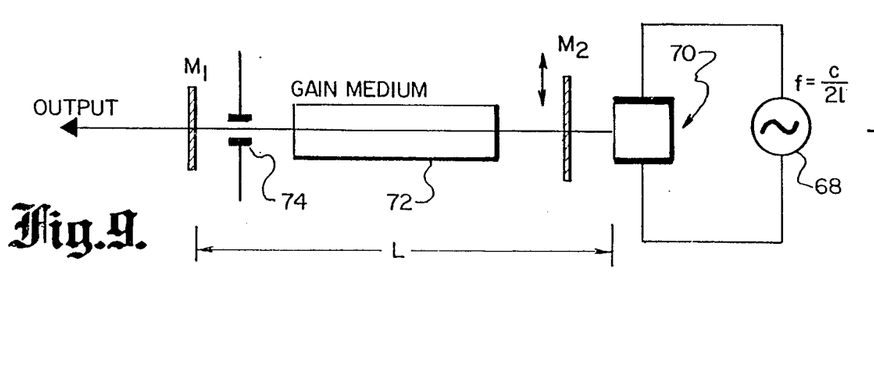
FIG. 9 is a block diagram of the invention applied to a mode-locking laser.

FIG. 9 illustrates the application of the invention to an improved mode-locked laser. In such a laser, output pulses with sharp peaks are obtained by periodically interrupting the light resonating within the laser at a rate which is equal to the round trip light transit time. It has been known in the past to employ a four-wave PCM in a mode-locked laser, with the PCM's pump lasers pulsed at the desired interruption frequency. With the present invention the pumping lasers are replaced by a variable electric field voltage source 68 which establishes an alternating electric field through the photorefractive conjugating medium 70 at a frequency equal to $c/2L$, where c is the speed of light and L is the effective, or optical, length of the laser's resonating cavity.

Figure 10:
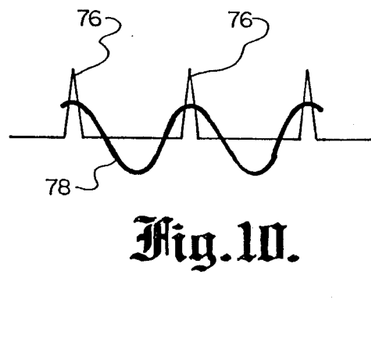
FIG. 10 is a graph contrasting the PCM modulating frequency with the laser output of the system illustrated in FIG. 9.

The laser itself includes the PCM 70 at one end, an apertured mirror M1 at the opposite end, a gain medium 72 between the two, a removable mirror M2 between the gain medium and PCM 70, and an intracavity aperture 74. The laser is first started using mirror M2, while electric field voltage source 68 forms gratings in the PCM medium 70. Mirror M2 is then removed, permitting oscillation to continue between M1 and the PCM. Mode-locking occurs as a result of the gratings formed by the alternating electric field. A laser that self-compensates for slowly varying (intracavity) distortions and is also mode-locked is thus realized. FIG. 10 illustrates the sharp peaks 76 that can be obtained for the pulsed laser output, even though the PCM is modulated with a smooth signal such as sinusoid 78 from voltage source 68.

Figure 11:
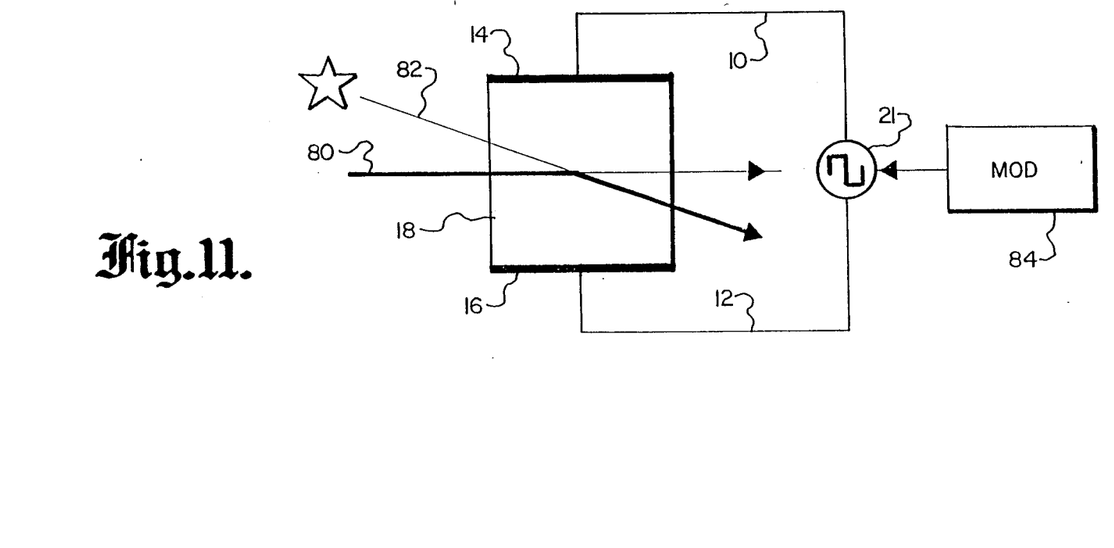
FIG. 11 is a block diagram of the invention employed in a modulated image amplification application using a two-wave beam coupling technique.

The application of the invention to an image amplifier is illustrated in FIG. 11. The apparatus is essentially similar to that illustrated in FIG. 5, and common reference numerals are used. The electric field voltage source 21 effects the index ellipsoid of the photorefractive medium 18 via the electro-optic effect, and also its photorefractive response if the frequency is low enough. This governs the transfer of energy from an input energy source beam 80 to a beam 82 which can bear an optical image, the two beams cross-coupling within the crystal 18. Energy is transferred via a two-wave coupling mechanism from beam 80 to beam 82 in an amount governed by a varying electric field from source 8, thus amplifying the image beam 82. The output image beam 82 is, in general, modulated (by the source 8) in terms of its phase, amplitude, frequency or polarization relative to the incident beam by the photorefractive crystal.

A novel system and method for encoding an optical beam with information at high data rates through a variety of modulation techniques, and with numerous optical applications, has thus been shown and described. It should be understood that numerous modifications and alternate embodiments will occur to those skilled in the art. For example, it might be possible to use frequency modulation of a photorefractive crystal as a dither signal in conjunction with either a PCM or a beam amplifier in a ring laser gyroscope. Accordingly, it is intended that the invention be limited only in terms of the appended claims.

I claim:

1. A system for encoding information onto an optical beam, comprising:
   a body of photorefractive material adapted to receive an input optical beam,
   means for establishing photorefractive gratings within said body to produce a phase conjugate output beam in response to an input optical beam,
   means for establishing an alternating electric field within the body concurrently with said photorefractive gratings, and
   means for modulating said electric field relative to said body to encode said phase conjugate output beam.

2. The system of claim 1, the means for establishing an alternating electric field comprising means for establishing the field with an alternating frequency substantially higher than the noise bandwidth of the input beam, the field thereby providing a higher frequency carrier to substantially isolate the modulation from noise in the beam frequency range.

3. The system of claim 1, wherein the means for modulating the alternating electric field comprises means for modulating the alternation frequency.

4. The system of claim 1, wherein the means for modulating the alternating electric field comprises means for modulating the alternation phase.

5. The system of claim 1, wherein the means for modulating the alternating electric field comprises means for modulating the alternation amplitude.

6. The system of claim 1, the photorefractive material comprising a two-wave phase conjugate mirror medium, wherein the means for modulating the alternating electric field relative to said body comprises means for modulating the polarization of said phase conjugate output beam.

7. The system of claim 1, further comprising means for modulating the electric field with a plurality of multiplexed modulation signals.

8. A system for encoding information onto an optical beam, comprising:
   a body of photorefractive material adapted to receive an optical beam,
   means for inducing photorefractive gratings within said body, and
   means for modulating the body's index ellipsoid via the electro-optic effect concurrently with said photorefractive gratings to encode an optical beam diffracted by the body.

9. The system of claim 8, the modulating means being adapted to modulate the body's index ellipsoid via the electro-optic effect at a substantially higher frequency range than the beam noise bandwidth, and thereby substantially isolate the modulation from noise in the beam frequency range.

10. A system for encoding information onto an optical beam, comprising:
    a body of photorefractive material adapted to receive a first optical beam,
    means for applying at least one second optical beam to the body to cross-couple with the first beam within the body and produce a resultant output beam,
    means for establishing an alternating electric field within the body to induce a variance in the index ellipsoid via the electro-optic effect of the body upon the output beam, and
    means for modulating the alternating electric field within the body to encode desired information onto the output beam.

11. The system of claim 10, for use with a noisy first optical beam, wherein the alternating field means is adapted to establish an alternating electric field at a substantially higher frequency of alternation than the laser beam noise frequency, thereby providing a higher frequency carrier to substantially remove the modulating signal from the noise associated with the beam.

12. The system of claim 10, said photorefractive body and second beam means comprising a phase conjugate mirror (PCM) with the output beam comprising a phase conjugate of the first beam.

13. The system of claim 12, the second beam means comprising means for applying a pair of pump beams to the body to establish a four-wave mixer PCM.

14. The system of claim 12, the means for applying a second optical beam to the body comprising means for returning the first beam through the body at a return angle to the first beam path within the body which is sufficiently small to induce the formation of the output beam as a phase conjugate of the first beam, whereby the PCM is self-pumped.

15. The system of claim 14, wherein the photorefractive material is a semiconductor, and the magnitude and frequency of the alternating electric field increases the optical gain of the photorefractive material to enable self-pumping.

16. The system of claim 15, wherein the modulating means produces a modulating signal within a substantially higher frequency range than the frequency of field alternation, thereby encoding information onto the phase conjugated output beam substantially through modulation of the photorefractive material's electro-optic effect.

17. The system of claim 15, wherein the modulating means produces a modulating signal within the frequency regime of the field alternation, thereby encoding information onto the phase conjugated output beam by modulating both the photorefractive material's index ellipsoid via the electro-optic effect and photorefractive response.

18. The system of claim 12, the modulating means providing information to be remotely sensed, further comprising optical fiber means arranged to transmit the first beam to the photorefractive body and to receive the phase conjugated output beam, thereby enabling the output beam to be transmitted through the optical fiber means to a remote location from the PCM.

19. The system of claim 12, further comprising a second PCM of similar construction to the first PCM with an associated means for establishing an alternating electric field within the body of the second PCM at a frequency substantially equal to the unmodulated alternating field frequency for the first PCM, and means for sensing frequency differences between the phase conjugated output beams of the two PCMs to detect the modulation applied to alternating field for the first PCM.

20. The system of claim 12, further comprising an apertured mirror spaced from the PCM and a laser gain medium between the mirror and PCM, the mirror, PCM and gain medium comprising a phase conjugate laser, wherein the modulating means is adapted to modulate the electric field within the PCM's photorefractive body at a mode locking frequency.

21. The system of claim 10, implemented as a variable gain image amplifier, wherein the first optical beam contains an image to be amplified, a two-wave mixing means is provided to cross-couple the second optical beam with the first beam to provide an energy transfer to the first beam, and the field modulating means is adapted to encode the transfer of energy from the first to the second beam.

22. A self-pumped phase conjugate mirror (PCM), comprising:
    a crystal formed from a photorefractive material adapted to receive a first laser beam,
    means for applying an alternating electric field across the crystal, said field being selected to establish a photorefractive index grating shift of about 90° within the crystal,
    means for returning the first beam to the crystal at a return angle to the first beam path within the body at which a phase conjugated output beam is produced, and
    means for modulating the alternating electric field to encode information onto the output beam.

23. The self-pumped PCM of claim 22, wherein the modulating means is adapted to modulate the electric field at a substantially higher frequency than the frequency of the photorefractive response, and thereby encode the output beam by means of modulations in the crystal's index ellipsoid via the electro-optic effect with the crystal's photorefractive-induced index grating remaining substantially stationary.

24. A method of encoding information onto an optical beam, comprising:
    establishing an alternating electric field within a body of photorefractive material,
    establishing photorefractive gratings within said body concurrently with said field, while
    transmitting an input optical beam into the body,
    operating upon the input beam within the body to establish a phase conjugate output beam, and
    modulating the electric field relative to said body to encode said phase conjugate output beam.

25. The method of claim 24, wherein the alternating field frequency is substantially greater than the input beam's noise frequency bandwidth, thereby providing a higher frequency carrier to substantially isolate the modulation from noise in the beam frequency range.

26. The method of claim 24, wherein the electric field is modulated by modulating its alternation frequency.

27. The method of claim 24, wherein the electric field is modulated by modulating its alternation phase.

28. The method of claim 24, wherein the electric field is modulated relative to said body by modulating the polarization of said phase conjugate output beam.

29. The method of claim 24, wherein the electric

30. A method of encoding information onto an optical beam, comprising:
    inducing photorefractive gratings within a body of photorefractive material, while
    transmitting an input optical beam into said body,
    diffracting said input beam within the body by said gratings, and
    modulating the body's index ellipsoid via the electroptic effect to encode the diffracted beam.

31. The method of claim 30, wherein the body's index ellipsoid is modulated via the electro-optic effect at a substantially higher frequency range than the input beam's noise frequency spectrum, thereby substantially isolating the modulation from noise in the beam frequency range.

32. A method of encoding information onto an optical beam, comprising:
    transmitting a first optical beam through a body of photorefractive material,
    establishing an alternating electric field within the body to induce a variance in the body's index ellipsoid via the electro-optic effect,
    applying at least one second optical beam to the body to cross-couple with the first beam and produce a resultant output beam, and
    modulating the alternating electric field to encode desired information onto the output beam through variations in the body's index ellipsoid via the electrooptic effect.

33. The method of claim 32, wherein the photorefractive index grating shift within the body of about 90°, and the application of the second beam to the body comprises returning the first beam through the body at a return angle to the first beam to produce an output beam as a phase conjugate of the first beam, thereby providing self-pumped conjugate reflection of the first beam.

34. The method of claim 32, wherein the electric field alternation is substantially higher rate than the body's photorefractive response time, the field modulation thereby encoding the output beam by modulating the body's electro-optic effect without substantially shifting its index gratings.

* * * * *